US 6,699,363 B2

(12) United States Patent
Moffett

(10) Patent No.: US 6,699,363 B2
(45) Date of Patent: Mar. 2, 2004

(54) MODIFIED STARCH AND PROCESS THEREFOR

(75) Inventor: Robert Harvey Moffett, Landenberg, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 159 days.

(21) Appl. No.: 10/066,969

(22) Filed: Nov. 13, 2001

(65) Prior Publication Data

US 2003/0102097 A1 Jun. 5, 2003

(51) Int. Cl.[7] ................................. D21H 21/10
(52) U.S. Cl. ................. 162/168.3; 162/175; 162/181.1; 162/181.2; 162/183; 524/27; 524/47; 536/101; 536/123.1
(58) Field of Search ............................ 162/175, 181.1, 162/181.2, 183; 536/101, 1.11, 123.1; 524/27, 47

(56) References Cited

U.S. PATENT DOCUMENTS

| 4,066,495 A | 1/1978 | Voigt et al. |
| 4,388,150 A | 6/1983 | Sunden et al. |
| 4,643,801 A | 2/1987 | Johnson |
| 4,954,220 A | 9/1990 | Rushmere |
| 5,176,891 A | 1/1993 | Rushmere |
| 5,178,730 A | 1/1993 | Bixler et al. |
| 5,482,693 A | 1/1996 | Rushmere et al. |
| 5,859,128 A | 1/1999 | Moffett |
| 6,033,525 A | 3/2000 | Moffett |

FOREIGN PATENT DOCUMENTS

| GB | 1177612 | 1/1967 |
| JP | S60-128398 A | 7/1985 |
| JP | Hei2-14098 A | 1/1990 |
| WO | WO 91 07543 A | 5/1990 |

OTHER PUBLICATIONS

Hashimoto et al, Dispersion of Paper–strengthening Agents Imparting Good Retention of Fillers and Additive CA 111:9159 (Oct. 7, 1989).
Nakamura Hiromi. Method for Papermaking, Derwent Patent Abstract of Japan 02014096 (Jan. 18, 1990).
Hasegawa Shigeyuli, Paper–Making Method, Derwent Patent Abstract of Japan 06166986 (Jun. 14, 1994).

*Primary Examiner*—Peter Chin

(57) ABSTRACT

A process that can be used for producing a starch product is provided. The process comprises heating a composition, which comprises or consists essentially of a starch, a polyacrylamide, and a multivalent cation. The weight ratio of starch to polyacrylamide is greater than about 2 to 1. The process can also comprise heating a composition, which comprises or consists essentially of a starch and a polyacrylamide to produce a heated composition followed by contacting the heated composition with a multivalent cation. The heating can be carried out at a pH above 7.0 if the polyacrylamide is a cationic polyacrylamide or nonionic polyacrylamide and, if the starch is a cationic starch and the polyacrylamide is an amphoteric polyacrylamide or anionic polyacrylamide, the heating neutralizes less than 75% of the cationic starch.

20 Claims, No Drawings

MODIFIED STARCH AND PROCESS THEREFOR

FIELD OF THE INVENTION

This invention relates to a process for producing a starch composition, to a paper furnish comprising the starch composition, to a process for using the starch composition as retention aid in papermaking and to a process for using the starch composition as clarifying aid for removing solids from an aqueous dispersion.

BACKGROUND OF THE INVENTION

Paper production involves the formation and dewatering of a web primarily composed of cellulose fibers and inorganic filler. The web is formed by spreading an aqueous suspension containing the cellulose fibers and inorganic filler over a wire or net, and then removing water to form a fiber web or sheet. The aqueous suspension is referred to as "paper furnish" in the trade, and the removed water is referred to as "white water."

The industry long has sought ways to reduce the percentage of small cellulose fibers and filler particles that are removed with the white water as the paper web is formed. Not only does this represent a loss of material, but it also contributes to a build-up of material in the white water known as "anionic trash" that impairs efficient operation of the equipment. Thus, improved retention of the smaller particles not only makes water removal easier, but also improves yield and productivity of the papermaking process.

Many additives have been suggested in the prior art for improving fines retention and wet-end drainage. Cationic starches frequently are used for this purpose, particularly the relatively expensive cationic potato and waxy maize starches. Less expensive cationic corn starch has been used, but it generally does not provide adequate fines retention and wet-end drainage.

Many suggestions are made in the prior art concerning improvements to the efficiency of starches for this purpose. U.S. Pat. Nos. 5,859,128 and 6,048,929 disclose a modified starch wherein the starch is prepared by cooking the starch in the presence of a nonionic, amphoteric, or cationic polyacrylamide. The modified starch exhibits improved performance as a retention additive in the manufacture of paper. U.S. Pat. No. 5,928,474 discloses a paper furnish containing a modified starch such as prepared in the above two patents. U.S. Pat. No. 6,033,525 discloses a paper furnish containing a modified starch such as prepared above and a soluble aluminum compound wherein the performance of the modified starch is enhanced by the presence of the aluminum compound in the furnish.

The process disclosed above require adding an alkaline aluminum compound such as, for example, sodium aluminate and an anionic aluminum compound to polyacrylamide in the cooking step to improve retention. However, the cost of sodium aluminate is relatively high compared to other basifying agents. There is a need for improving fines retention and wet-end drainage in papermaking without the use of sodium aluminate to produce a modified starch.

SUMMARY OF THE INVENTION

A process that can be used for producing a starch product is provided.

The process comprises heating a composition, which comprises or consists essentially of a starch, a polyacrylamide, and a multivalent cation in which the weight ratio of starch to polyacrylamide is greater than about 2 to 1. The process can also comprise heating a composition, which comprises or consists essentially of a starch and a polyacrylamide to produce a heated composition followed by contacting the heated composition with a multivalent cation. The heating can be carried out at a pH above 7.0 if the polyacrylamide is a cationic polyacrylamide or nonionic polyacrylamide and, if the starch is a cationic starch and the polyacrylamide is an amphoteric polyacrylamide or anionic polyacrylamide, the heating neutralizes less than 75% of the cationic starch.

DETAILED DESCRIPTION OF THE INVENTION

The term "heating" used herein is exchangeable with "cooking".

The starch can be any of those known to one skilled in the art for use in papermaking. It is preferably an amphoteric starch or cationic starch. A cationic starch can be derived from any common starch producing materials such as corn starch, potato starch, waxy maize starch, wheat starch, and combinations of two or more thereof. It can be obtained by any means known to one skilled in the art such as, for example, cationization by addition of 3-chloro-2-hydroxypropyltrimethylammonium chloride to obtain cationic starches with various degrees of nitrogen substitution. The degree of cationic substitution on the starches (weight % nitrogen/starch) can range from about 0.01 to about 0.2, preferably 0.02 to 0.15. Examples of naturally occurring amphoteric starches include potato starch. Synthetic amphoteric starches can also be used.

Any polyacrylamide known for use in papermaking can be used. It includes cationic polyacrylamide, anionic polyacrylamide, amphoteric polyacrylamide, and nonionic polyacrylamide. The preferred polyacrylamide is a cationic polyacrylamide having a molecular weight of at least 500,000, preferably at least 1,000,000. A suitable cationic, anionic or amphoteric polyacrylamide can have a degree of substitution by weight from 1% to about 80%, preferably from 10% to about 40%. Degree of substitution means that the polymers contain a certain degree or percent of randomly repeating monomer units containing chemical functionality which become charged when the polymer is dissolved in water. For example, the monomer units in cationic polyacrylamides or amphoteric polyacrylamides include, but are not limited to, groups such as amine groups. The polyacrylamide can be a solid, powder form, micro-bead form, a water-in-oil emulsion or any other commercially known form. Suitable polyacrylamides can be obtained from Allied Colloids, Suffolk, Va., and from Nalco, Naperville, Ill. as well as other sources.

Though a variety of multivalent cations can be used, it is preferred to use a multivalent cation that does not interfere with a papermaking process or an end use of the paper product. These cations include, but are not limited to, calcium cation, magnesium cation, iron cations, aluminum cations, zinc cation, titanium cations, cobalt cations, nickel cation, copper cation, barium cation, zirconium cation, manganese cation, and combinations of two or more thereof. The preferred cations are calcium cation, magnesium cation, and combinations thereof. The cations can also be combined with any suitable anion such as, for example, sulfate, nitrate, chloride, carbonate, phosphate, borate, hydroxide, oxide, and combinations of two or more thereof, provided that the resulting combination does not interfere with a papermaking process or an end use of a paper product.

A starch, a polyacrylamide, and a multivalent cation can be combined by any means known to one skilled in the art such as, for example, dry blended together or blended as a slurry or slurries in water. They can be combined before being heated. Polyacrylamide can be blended with a starch when the starch is being heated. A multivalent cation can also be introduced any time to produce the composition. A polyacrylamide, before being blended and/or heated with a starch can also be prehydrated, i.e., mixed with water prior to its combination with the starch. Wishing not to be bound by theory, it is believed that prehydration causes a polyacrylamide molecule, initially in the form of a coil, to unwind and become more soluble and/or reactive. Rather than blending dry or slurried starch, the starch can instead be heated or cooked, blended with the polyacrylamide, and then re-heated or re-cooked. Heating can be carried out by any means known to one skilled in the art such as using a starch cooker at a paper mill. A batch cooker or continuous cooker, such as a jet cooker, can be used. Continuous jet cooking can be conducted at temperatures from about 80 to 130° C. at 1 atmosphere or higher pressure or at any temperature that can accommodate pressure. The solids content during cooking generally is less than 15%, but higher solids concentrations can be used.

Heating is generally carried out under a sufficient condition to gelatinize the starch and to at least partially hydrate a polyacrylamide and the hydrated react with the starch. Elevated temperatures above 60° C., preferably above 65° C., and more preferably 80° C. to 100° C. can be used. Temperatures below 60° C. can also be used for some compositions and cooking equipment. Temperatures above 100° C., for example, as high as 130° C., or higher can be used if decomposition of the starch and polyacrylamide is prevented under a suitable pressure. Generally it can be as short as a few minutes to about 2 hours. Longer times generally are required for lower temperatures.

When using cationic or nonionic polyacrylamide, best results are obtained if the starch/polyacrylamide mixture is cooked at a pH above 7, although some improvement in ash retention is also found at a pH below 7.

The preferred cooking pH for either cationic or nonionic polyacrylamide and starch is from about 8 to about 10.5. Cooking pH is not critical when an anionic or amphoteric polyacrylamide is used, but typically can be in the range of 3 to 11. Cooking pH can be adjusted with conventional acids, bases, or salts.

The weight ratio of starch to PAM can vary with selected starch and polyacrylamide, and the extent to which improvements are desired in fines retention and wet end drainage, but is preferably above 2 to 1, preferably greater than 5 to 1, and more preferably greater than 10 to 1. For example, it has been found that poor-performing corn starch may be improved to the extent that it is equal or superior to the more expensive potato starch by cooking the corn starch with as little as 1% polyacrylamide, by weight. The amount of polyacrylamide added to the starch is preferably limited below that which can cause the starch to precipitate, which varies with the starch, polyacrylamide, and/or multivalent cation used.

The multivalent cation can be combined with a starch, a polyacrylamide, or a combined starch/polyacrylamide mixture at any time before, during, or after the heating step. It is preferably added before or during cooking. The amount of cation can be in the range of about 0.001 to about 20, preferably about 0.01 to about 15, and most preferably about 0.1 and about 10 parts by weight of cation per part of polyacrylamide.

The process is preferably carried out under moderate to low shear conditions. The composition produced by the process is also preferably stored under such conditions. That is, the agitation used is preferably adequate to mix the ingredients together and to aid in heat transfer requirements, but not produce an unnecessarily high shear which can degrade the effectiveness of a starch/polyacrylamide composition. The conditions can include lower than about 500 rpm (revolution per minute), preferably lower than about 450 rpm, more preferably lower than 350 rpm, and most preferably lower than 250 rpm. Also preferred is no agitation at all during cooling and/or storage.

The cooked starch/polyacrylamide composition, referred to herein as modified starch, can be added to any suitable paper furnish as a retention aid to improve fines retention and wet end drainage. The paper furnish can contain a variety of wood pulp and inorganic fillers, and typically has a pH of about 4 to 10. For example, bleached kraft pulp, thermomechanical, chemical-thermomechanical or groundwood pulps can be used together with clays, precipitated or ground calcium carbonate, titanium dioxide, and other inorganic fillers if desired. Such fillers typically are used at the 15% to 20% loading level, as a weight percent of the total paper weight, but can reach higher levels such as 30% or higher, for some specialty applications.

Particularly advantageous results can be obtained when the paper furnish also contains an anionic inorganic colloid, as is conventional in the papermaking industry. Thus the furnish can contain, for example, montmorillonite, bentonite, silica sols, aluminum modified silica sols, aluminum silicate sols, polysilicic acid, polysilicate microgels and polyaluminosilicate microgels, separately or in combination.

The paper furnish also can contain other typical additives, such as size, aluminum compounds (alum, aluminates, polyaluminum chlorides, etc.), cationic polymers (retention aids and flocculants), anionic polymers, and/or separate additions of starch. Aluminum compounds in particular have been found to boost retention performance of the cooked starch/polyacrylamide compositions. While the above additives can be added in any, the preferred order is to add the aluminum compound first, the cooked starch/polyacrylamide of this invention, and then an inorganic anionic colloid.

Generally, a paper furnish can contain, based on total dry weight of the paper furnish, at least about 0.01 and preferably between 0.1–50 kg/tonne of the starch/acrylamide (modified starch) of the invention; at least about 0.01 and preferably between 0.1–40 kg/tonne of an anionic inorganic colloid; and optional aluminum compounds of about 0.01 to 20 kg/tonne on an $Al_2O_3$ basis.

While the invention has been described in detail as applied to papermaking, the compositions produced by the invention process also have utility as clarifying aids to remove solids from aqueous suspensions.

The invention now will be exemplified, but not limited, by the following Examples.

EXAMPLES

For consistency, in all examples the performance of the test solutions was measured as retention aids in a 5 g/l paper furnish composed of 35% bleached kraft hardwood, 35% bleached kraft softwood, and 30% precipitated calcium carbonate (PCC). The furnish pH was 8.0 and was mixed in a Britt Jar equipped with a 50R screen (100 mesh) at 750 RPM. Ash retentions were determined from white water samples using Tappi Standard T-261.

Example 1

This example demonstrates how adding a magnesium compound to a cooking solution improves starch performance as a retention aid.

First, Percol® 182 cationic polyacrylamide (C-PAM) from Ciba Specialty Chemicals, Basel, Switzerland, was prehydrated for 1 hour at 0.125 weight % in deionized water. Then 18 g of Stalok® 410 cationized potato starch (containing 17% moisture) from Staley Starch (Decatur, Ill.) was slurried in 150 g of the above C-PAM solution. Next, several solutions of deionized water containing various amounts of $MgSO_4$ and 3 ml of 0.1 N NaOH were prepared and heated to 90° C. Aliquots of the starch/C-PAM slurry were added to the solution of $MgSO_4$ and NaOH in an amount of 28 g to 467 g of water. The resulting solution was cooked for 20 minutes at 90° C. while being mixed at 400 rpm. The solution was then removed from the hot plate and allowed to cool to room temperature (about 25° C.). Deionized water was added to make up for any water lost to evaporation.

The cooked starch/C-PAM solutions were then tested for ash retention. A 5 g/l paper furnish described above was mixed at 750 rpm in a standard Britt Jar equipped with a 50R screen. Alum was added to the furnish in an amount of 0.5 lb/ton (0.25 kg/tonne) as $Al_2O_3$ followed by the cooked starch/C-PAM slurry at a dose rate of 15 lb/ton (7.5 kg/tonne) starch and 0.2 lb/ton (0.1 kg/tonne) C-PAM, followed by various amounts of 4 nm colloidal silica from Nalco Chemical Company, Naperville, Ill. ($SiO_2$). Chemical additions to the furnish were made at 15 second intervals. Then 15 seconds after the addition of the colloidal silica, the drain on the bottom of the Britt jar was opened and a sample collected to determine ash content. In the table below, the term "Mg/C-PAM wt ratio in cooked modified starch" is calculated by dividing the Mg in the $MgSO_4$ by the dry weight of C-PAM. Subsequent tables are calculated similarly.

TABLE 1

| Mg/C-PAM wt ratio in cooked modified starch | % Ash Retention vs. Mg/C-PAM to Starch/C-PAM and $SiO_2$ Dose | | |
|---|---|---|---|
| | 1 lb $SiO_2$/ton | 2 lb $SiO_2$/ton | 4 lb $SiO_2$/ton |
| 0 | 57 | 70 | 80 |
| 0.16 | 68 | 79 | 86 |
| 0.32 | 66 | 78 | 89 |
| 1.6 | 70 | 81 | 91 |

As can be seen from the Table, the presence of added magnesium ions improves the performance of a cooked starch in terms of % ash retention relative to the starch with no magnesium ions present when used in combination with a cationic polyacrylamide. Routine optimization can be used to identify the best combination to maximize retention.

Example 2

This example demonstrates how the presence of calcium and magnesium ions in a cooking solution improves starch performance as a retention aid.

First, a sample of Percol® 182 C-PAM was prehydrated for 1 hour at 0.125 weight % in deionized water to produce a C-PAM solution. Then 18 g of uncooked Stalok® 410 cationized potato starch was slurried in 150 g of the above C-PAM solution. Then 28 g aliquots of the starch/C-PAM slurry were added to 467 g of tap water that contained sufficient $CaCl_2$ to provide a weight ratio of 3.2 Ca/C-PAM to Starch/C-PAM, and 3 ml of 0.1 N NaOH. The water, $CaCl_2$ and NaOH were heated to 90° C. before addition of the starch/C-PAM slurry. The resulting solution was cooked for 20 minutes at 90° C. while being mixed at 400 rpm. The solution was then cooled to room temperature. Tap water was added to make up for any water lost to evaporation. The tap water was analyzed and found to contain about 40 ppm (parts per million by weight) Ca and 15 ppm Mg.

Ash retention was measured using the same method as in Example 1.

TABLE 2

| Ca/C-PAM wt ratio in cooked modified starch | % Ash Retention vs. Ca/C-PAM to Starch/C-PAM and $SiO_2$ Dose | | |
|---|---|---|---|
| | 1 lb $SiO_2$/ton | 2 lb $SiO_2$/ton | 4 lb $SiO_2$/ton |
| 0 | 66 | 76 | 90 |
| 3.2 | 73 | 85 | 92 |

As can be seen from the Table, the presence of added multivalent cations improved the performance of a cooked starch in terms of % ash retention relative to the starch in the absence of multivalent cations when used in combination with a cationic polyacrylamide.

Example 3

This example demonstrates how adding a calcium compound to a cooking solution improves starch performance as a retention aid.

First 18 g of Stalok® 410 potato starch Staley Starch were slurried with 150 g of a solution of Percol® 182 C-PAM, prehydrated at 0.125 weight % in deionized water as in Example 1. Then 28 g aliquots of the starch/C-PAM slurry were added to 467 g of deionized water that contained various amounts of $CaCl_2$ and 3 ml of 0.1 N NaOH. The water, $CaCl_2$ and NaOH were heated to 90° C. before addition of the starch/C-PAM slurry. The solution was cooked for 20 minutes at 90° C. while being mixed at 400 rpm as in Example 1. The solution was then removed from the hot plate and cooled to room temperature. Deionized water was added to make up for any water lost to evaporation.

Ash retention was measured using the same method as in Example 1.

TABLE 3

| Ca/C-PAM wt ratio in cooked modified starch | % Ash Retention vs. Ca/C-PAM to Starch/C-PAM and $SiO_2$ Dose | | |
|---|---|---|---|
| | 1 lb $SiO_2$/ton | 2 lb $SiO_2$/ton | 4 lb $SiO_2$/ton |
| 0 | 49 | 55 | 72 |
| 1.6 | 59 | 70 | 81 |
| 3.2 | 60 | 70 | 79 |

As can be seen from the Table, the presence of added calcium ions improved the performance of a cooked starch in terms of % ash retention relative to the starch with no calcium ions present when used in combination with a cationic polyacrylamide.

Example 4

This example demonstrates an iron compound improves starch performance as a retention aid.

First 18 g of Stalok® 410 potato starch from Staley Starch was slurried with 150 g of a solution of Percol® 182 C-PAM, prehydrated at 0.125 weight % in deionized water as in Example 1. Then 28 g aliquots of the starch/C-PAM slurry were added to 467 g of deionized water that contained various amounts of $NH_4Fe(SO_4)_2 \cdot 12H_2O$ and 3 ml of 0.1N NaOH. The water, $NH_4Fe(SO_4)_2 \cdot 12H_2O$, and NaOH were heated to 90° C. before addition of the starch/C-PAM slurry. The solution was cooked for 20 minutes at 90° C. while being mixed at 400 rpm as in Example 1. The solution was then removed from the hot plate and cooled to room temperature. Deionized water was added to make up for any water lost to evaporation.

Ash retention was measured using the same method as in Example 1.

TABLE 4

| Fe/C-PAM wt ratio in cooked modified starch | % Ash Retention vs. Fe/C-PAM to Starch/C-PAM and $SiO_2$ Dose | | |
|---|---|---|---|
| | 1 lb $SiO_2$/ton | 2 lb $SiO_2$/ton | 4 lb $SiO_2$/ton |
| 0 | 48 | 62 | 78 |
| 0.16 | 64 | 75 | 90 |
| 0.32 | 74 | 85 | 90 |
| 1.6 | 74 | 85 | 91 |

As can be seen from the Table, the presence of added iron ions improved the performance of a cooked starch in terms of % ash retention relative to the starch with no iron ions present when used in combination with a cationic polyacrylamide.

Example 5

This Example demonstrates the benefit of preparation and storage of the starch/polyacrylamide composition under moderate to low shear conditions.

First 15 g of Stalok® 410 potato was slurried with 125 g of a solution of Percol® 182 C-PAM, prehydrated at 0.125 weight % in deionized water as in Example 1. Then 28 g aliquots of the starch/C-PAM slurry were added to 462 g of deionized water, 10 ml of 2.8% of $CaCl_2$ solution and 3 ml of 0.1N NaOH. The water, $CaCl_2$ and NaOH were heated to 90° C. before addition of the starch/C-PAM slurry. The solution was cooked for 20 minutes at 90° C. as in Example 1 while being mixed at either 600 or 400 rpm as stated below. The solution was then cooled to room temperature while mixing at 500 rpm or without agitation as stated below. Deionized water was added to make up for any water lost to evaporation. A portion of the sample prepared at 400 rpm and cooled to room temperature without agitation was then mixed at 500 rpm for 1 hour to simulate a high shear pumping condition.

Ash retention was measured using the same method and furnish composition as in Example 1.

TABLE 5

| Mixing rpm | | | % Ash Retention vs. Agitation | | |
|---|---|---|---|---|---|
| During cooking | Cooling Conditions | Storage Conditions | 1 lb $SiO_2$/ton | 2 lb $SiO_2$/ton | 4 lb $SiO_2$/ton |
| 600 | No Agitation | No Agitation | 26 | 45 | 65 |
| 400 | No Agitation | No Agitation | 54 | 69 | 71 |
| 400 | 500 rpm | No Agitation | 24 | 37 | 59 |
| 400 | No Agitation | 500 rpm for 1 hour after cooling | 18 | 40 | 57 |

As can be seen from the Table, less agitation either in mixing the composition during cooking or when cooling and during storage provided significantly higher ash retention. High shear pumping is expected therefore to detrimentally affect the performance of the starch composition.

Example 6

This example demonstrates how adding a calcium compound to a cooking solution containing anionic polyacrylamide improves starch performance as a retention aid.

First 18 g of Stalok® 410 potato starch was slurried in 150 g of a solution of Percol® 90L anionic polyacrylamide (A-PAM) from Ciba, prehydrated at 0.125 weight % (active basis) in deionized water, following the sequence in Example 1. Then 28 g aliquots of the starch/A-PAM slurry were added to 467 g of deionized water that contained various amounts of $CaCl_2$. The pH of the water was not adjusted. The water and $CaCl_2$ were heated to 90° C. before addition of the starch/A-PAM slurry. The solution was cooked for 20 minutes at 90° C. while being mixed at 400 rpm as in Example 1. The solution was cooled to room temperature. Deionized water was added to make up for any water lost to evaporation.

The cooked starch/A-PAM solutions were then tested for ash retention as described above. The furnish was mixed at 750 rpm in a standard Britt jar equipped with a 50R screen. Alum was added to the furnish in an amount of 0.5 lb/ton (0.25 kg/tonne) as $Al_2O_3$ followed by the cooked starch/A-PAM slurry at a dose rate of 15 lb starch/ton (7.5 kg/tonne) and 0.2 lb A-PAM/ton (0.1 kg/tonne) followed by various amounts of Nalco 4 nm colloidal silica. Chemical additions were made to the furnish at 15 second intervals. Then 15 seconds after the last addition of the colloidal silica, the drain on the bottom of the Britt jar was opened and a sample collected to determine ash retention.

TABLE 6

| Ca/C-PAM wt ratio in cooked modified starch | % Ash Retention vs. Ca/A-PAM to Starch/A-PAM and $SiO_2$ Dose | | |
|---|---|---|---|
| | 1 lb $SiO_2$/ton | 2 lb $SiO_2$/ton | 4 lb $SiO_2$/ton |
| 0 | 69 | 77 | 88 |
| 1.6 | 74 | 86 | 89 |
| 3.2 | 73 | 85 | 88 |

As can be seen from the Table, the presence of added calcium ions improved the performance of a cooked starch relative to the starch with no calcium ions present when used in combination with an anionic polyacrylamide.

What is claimed is:

1. A process comprising heating a composition, which comprises a starch, a polyacrylamide, and a multivalent cation to produce a modified-starch having an improved ash retention in paper furnish relative to a starch in the absence of a multivalent cation wherein said starch is selected from the group consisting of amphoteric starch and cationic starch; said polyacrylamide is selected from the group consisting of cationic polyacrylamide, anionic polyacrylamide, amphoteric polyacrylamide, and nonionic polyacrylamide; and the weight ratio of said starch to said polyacrylamide is greater than about 2 to 1 with the proviso that said heating is carried out at a pH above 7.0 when said cationic polyacrylamide or nonionic polyacrylamide is selected and neutralizes less than 75% of the charge of said cationic starch when said cationic starch and either said amphoteric polyacrylamide or said anionic polyacrylamide are selected.

2. A process comprising heating a composition, which comprises a starch and a polyacrylamide, to produce a heated composition and contacting said heated composition with a multivalent cation to produce a modified-starch having an improved ash retention in paper furnish relative to a starch in the absence of a multivalent cation wherein said starch is selected from the group consisting of amphoteric starch and cationic starch; said polyacrylamide is selected from the group consisting of cationic polyacrylamide, anionic polyacrylamide, amphoteric polyacrylamide, and nonionic poluacrylamide; and the weight ratio of said starch to said polyacrylamide is greater than about 2 to 1 with the proviso that said heating is carried out at a pH above 7.0 when said cationic polyacrylamide or nonionic polyacrylamide is selected and neutralizes less than 75% of the charge of siaf cationic starch when said cationic starch and either said amphoteric polyacrylamide or said anionic polyacrylamide are selected.

3. A process according to claim 1 further comprising cooling said modified-starch with an agitation of lower than about 500 rpm or without agitation.

4. A process according to claim 2 further comprising cooling said modified-starch with an agitation of lower than about 500 rpm or without agitation.

5. A process according to claim 3 wherein said starch has a degree of substitution in the range of form about 0.01 to 0.2.

6. A process according to claim 4 wherein said starch has a degree of substitution in the range of from about 0.01 to 0.2.

7. A process according to claim 5 wherein said polyacrylamide has a degree of substitution between 1% and 80% by weight and a molecular weight of at least 500,000.

8. A process according to claim 6 wherein said polyacrylamide has a degree of substitution between 1% and 80% by weight and a molecular weight of at least 500,000.

9. A process according to claim 1 wherein said multivalent cation is selected from the group consisting of calcium cation, magnesium cation, iron cations, aluminum cations, zinc cation, titanium cations, cobalt cations, nickel cation, copper cation, barium cation, zirconium cation, manganese cation, and combinations of two or more thereof.

10. A process according to claim 2 wherein said multivalent cation is selected from the group consisting of calcium cation, magnesium cation, iron cations, aluminum cations, zinc cation, titanium cations, cobalt cations, nickel cation, copper cation, barium cation, zirconium cation, manganese cation, and combinations of two or more thereof.

11. A process according to claim 7 wherein said multivalent cation is selected from the group consisting of calcium cation, magnesium cation, iron cations, and combinations of two or more thereof.

12. A process according to claim 8 wherein said multivalent cation is selected from the group consisting of calcium cation, magnesium cation, iron cations, and combinations of two or more thereof.

13. A modified starch produced by the process recited in claim 3.

14. A modified starch produced by the process recited in claim 4.

15. A modified starch produced by the process recited in claim 11.

16. A modified starch produced by the process recited in claim 12.

17. A paper furnish comprising a modified starch as recited in claim 13.

18. A paper furnish comprising a modified starch as recited in claim 14.

19. A paper furnish comprising a modified starch as recited in claim 15.

20. A paper furnish comprising a modified starch as recited in claim 16.

* * * * *